Feb. 18, 1941.  E. W. CARROLL  2,232,207
MEANS FOR INSPECTING FRUIT FOR PITS
Filed Aug. 29, 1939  3 Sheets-Sheet 1

INVENTOR,
ELLSWORTH W. CARROLL.
BY
Lippincott & Metcalf
ATTORNEYS.

Feb. 18, 1941.    E. W. CARROLL    2,232,207
MEANS FOR INSPECTING FRUIT FOR PITS
Filed Aug. 29, 1939    3 Sheets-Sheet 2
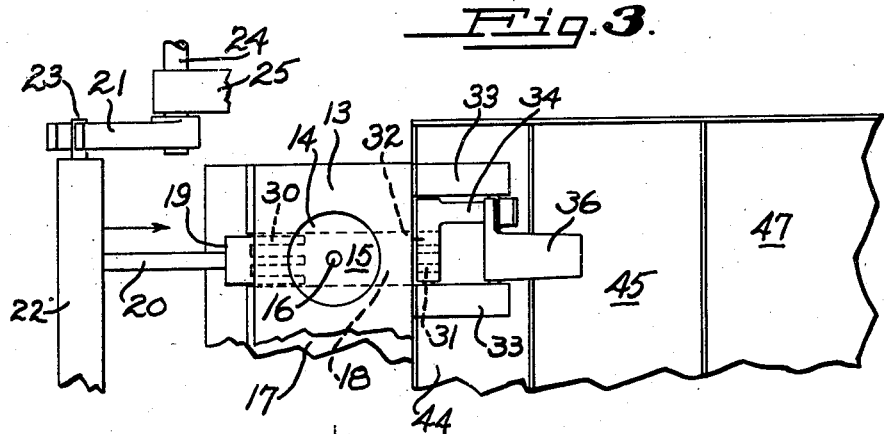
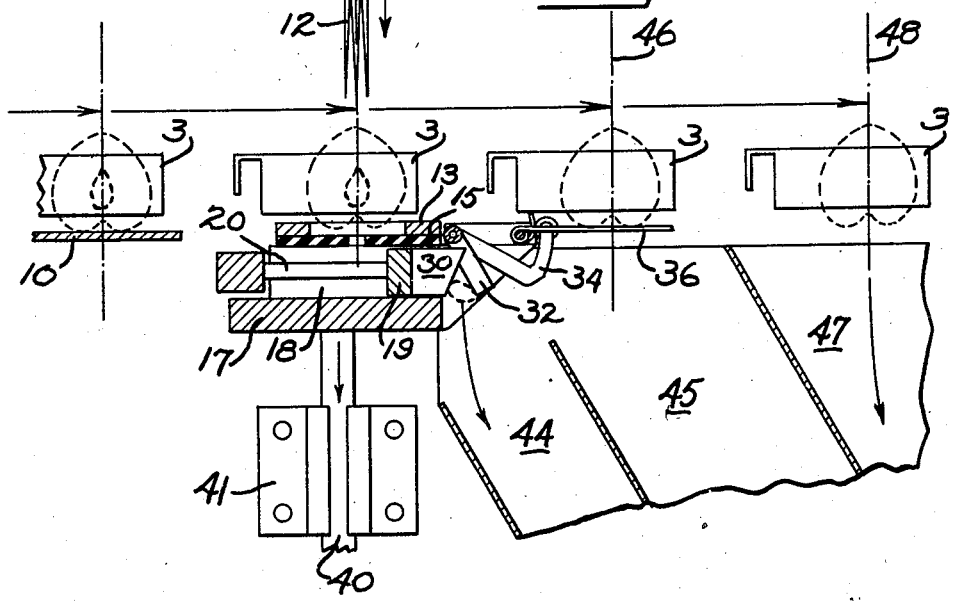
INVENTOR,
ELLSWORTH W. CARROLL.
BY
Lippincott & Metcalf
ATTORNEYS.

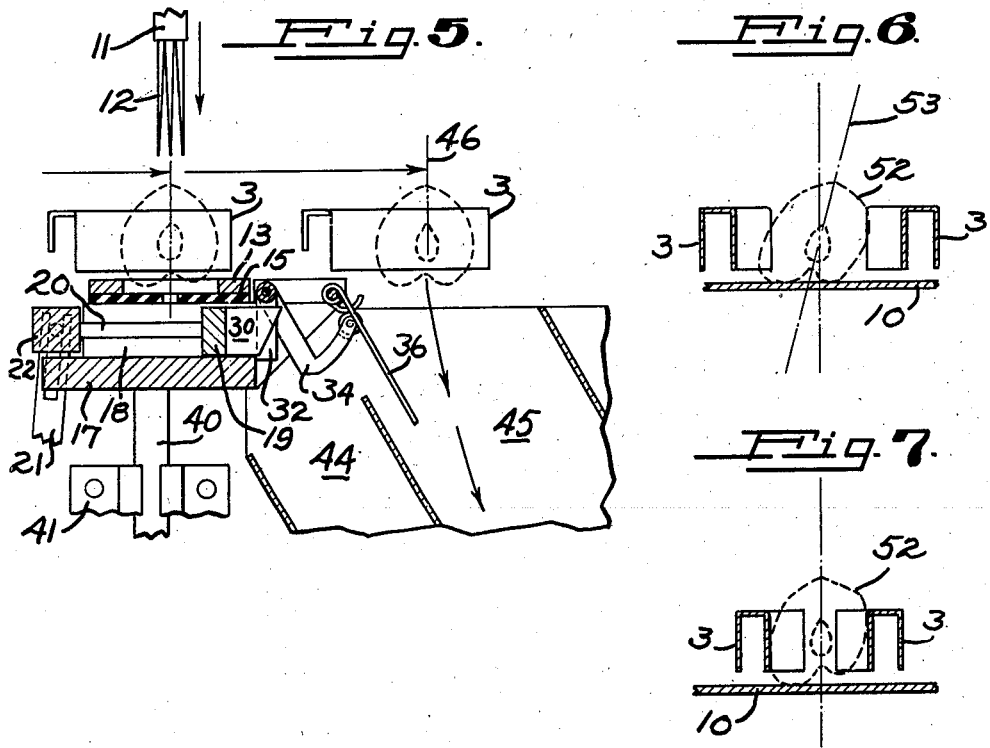

Patented Feb. 18, 1941

2,232,207

UNITED STATES PATENT OFFICE 2,232,207

MEANS FOR INSPECTING FRUIT FOR PITS

Ellsworth W. Carroll, San Francisco, Calif., assignor to S & W Fine Foods, Inc., San Francisco, Calif., a corporation of California Application August 29, 1939, Serial No. 292,431

14 Claims. (Cl. 146—19)

My invention relates to a means for inspecting fruit for pits, and more particularly to an apparatus for segregating pitted from unpitted fruit after a pitting operation.

Among the objects of my invention are: To provide a device automatically separating pitted from unpitted fruit; to provide a device automatically sorting fruit after pitting into groups containing pitted or unpitted fruit; to provide a device for automatically inspecting fruit, after a pitting operation operating by virtue of the presence or absence of a free pit; and to provide a means of segregating pitted from unpitted fruit, utilizing pits as an actuating element in the operation of the device.

Other objects of my invention will be apparent or will be specifically pointed out in the description forming a part of this specification, but I do not limit myself to the embodiment of the invention herein described, as various forms may be adopted within the scope of the claims.

Referring to the drawings:

Fig. 1 is a schematic view in vertical section, showing a preferred embodiment of my invention.

Fig. 2 if a top plan view of the fruit carrier clamps.

Fig. 3 is a view in elevation, taken as indicated by the line 3—3 in Fig. 1.

Fig. 4 is a diagrammatic sectional view similar to that of Fig. 1, showing the action of the inspection device when a pit is present.

Fig. 5 is a view similar to Fig. 4, showing the action of the device when a pit is not present.

Figs. 6 and 7 are sectional views showing the orientating action of a clamp on a fruit.

Inasmuch as my invention is ideally adapted for the pitting of orientated cherries, I have chosen as an example, a cherry pitting and inspecting machine, to illustrate my invention.

Figure 1:
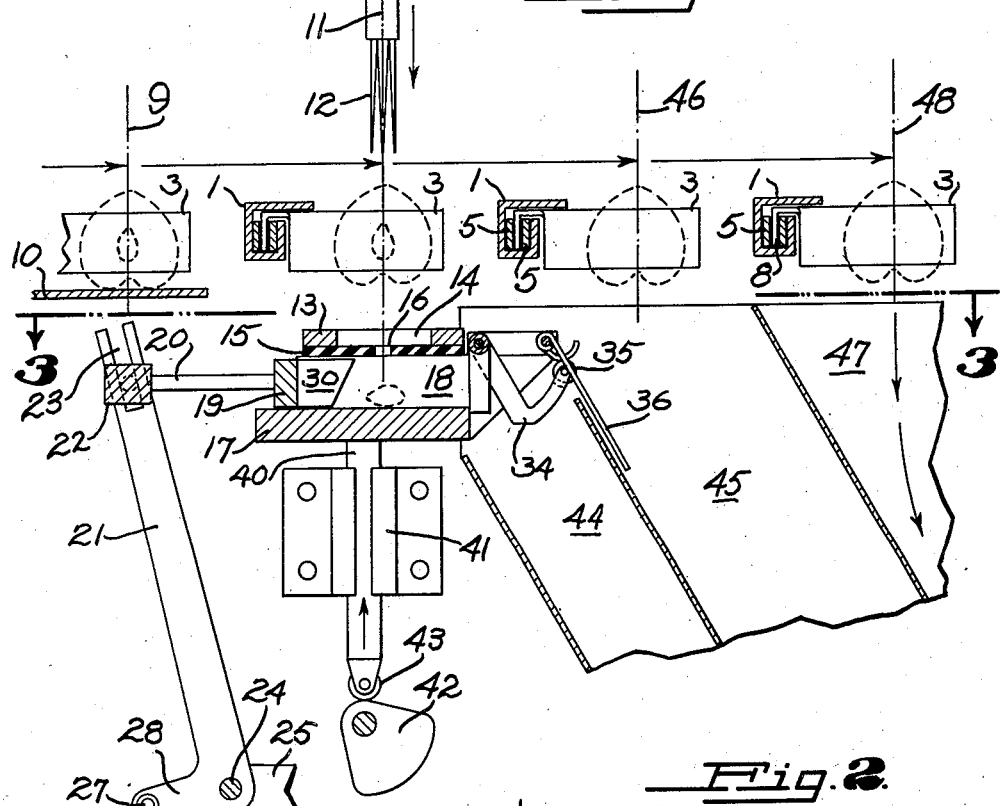
Figure 2:
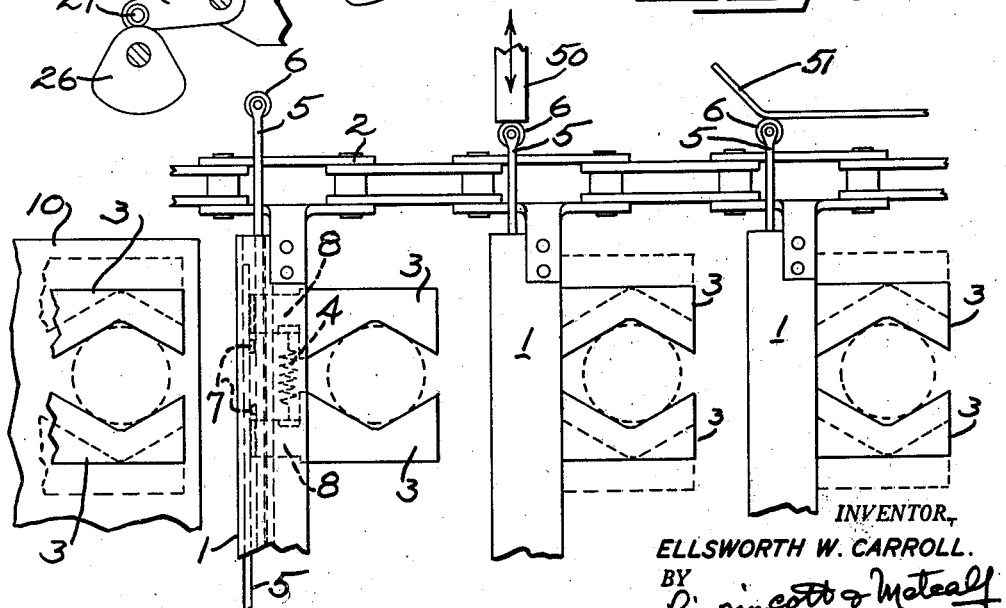

I refer first to Figs. 1 and 2, which show a fruit conveying system comprising a series of parallel conveyor bars 1 attached to an endless conveyor chain 2 on each side thereof, only one chain being shown. Preferably the conveyor bars are moved in a horizontal plane with an intermittent movement, stopping at spaced stations or stops along the plane. Mounted on the advancing edge of the conveyor bars are a plurality of fruit clamps, each comprising opposed clamp arms 3 urged together by spring 4 and positively opened by motion of control rods 5 terminating in rollers 6. Control rods 5 have pins 7 mounted thereon engaging lugs 8 on clamp arms 3 within the bars. Thus, any motion of rods 5 toward each other will open the clamps, and when rods 5 are released the clamps will close under the action of the clamp springs 4.

A fruit such as a cherry, indicated by dotted lines on all the drawings, is positioned in each clamp in an orientated position with the dimple or stem indent down, at the loading stop indicated by broken line 9. This orientation may be performed either by hand, or by a prior orientating portion of the machine which is no part of the present invention. Cherries held in the clamps are progressed over a horizontal base plate 10, as shown in Fig. 1, and moved to and stopped at a pitting stage directly beneath a pitting knife 11, which may be of the cherry pitting type comprising a plurality of needle points 12 arranged in a circle. At this stage the cherry is thus firmly held by the clamp, with the axis thereof passing through the stem indent, the center of the pit, and the pointed end of the cherry. This axis is usually vertical, in order that the pit may register with the end of a vertically movable pitting knife.

Directly beneath the cherry, but spaced therefrom, as the cherry arrives beneath the knife, is a pitting plate 13 of inflexible material having a large aperture 14 in the center thereof concentric with the clamp, backed by a flexible plate 15 preferably of soft rubber having a relatively small pit aperture 16 in the center thereof. The pitting plates are supported on a base plate 17 having a central chamber 18 therein for the reception of pits forced by the pitting knife through pit aperture 16. Central chamber 18 is traversed by a male comb 19, reciprocated therethrough in the direction of travel of the cherry by a comb rod 20 operated by a crank arm 21 through crank bearing 22, operating in terminal slot 23. Crank arm 21 is mounted on a pivot 24 attached to a foundation member 25 and is movable by a rotating cam 26 bearing against roller 27 mounted on a short arm 28. Thus, rotation of cam 26 causes the male comb 19 to reciprocate through chamber 18. Male comb 19 is provided with a plurality of comb teeth 30, as shown in Fig. 3. Comb teeth 30, when reciprocated to one end of their stroke, enter slots 31 in female comb 32 pivoted on arms 33 extended from plate 13. Female comb 32 is also provided with a rearwardly extending roller arm 34 terminating in a flap roller 35 which operates to rotate a flap 36 around a horizontal axis.

The entire comb, pitting plates and pit chamber assembly is raised and lowered in synchronism with clamp movements by means of a shaft 40 operating in bearing 41, this shaft being vertically moved by pitting cam 42 bearing on a pitting roller 43 mounted on the end of shaft 40.

Thus, both combs, the pitting plates and flap 36 are moved upwardly at each revolution of cam 42, and slot 23 in comb arm 21 allows the male comb 19 to rise.

Three discharge chutes are provided beyond the pitting stage, a pit chute 44 positioned to receive the output of pit chamber 18, and unpitted fruit chute 45 positioned below the next stop of the fruit clamps after the pitting stop, this stop being indicated by broken line 46, and a pitted cherry chute 47 beneath the second stop after the pitting stop, this second stop being indicated by broken line 48.

As the chain 2 and the connected bars 1 progress to their various stops, clamps are momentarily opened at the first stop after the pitting stop, by the action of a reciprocating pin 50 bearing on roller 6 attached to rods 5, and this opening is merely a momentary opening with immediate reclosure of the clamp arms.

At the second stop after the pitting stop, however, the clamps are opened by a stationary vertical cam 51 positioned to bear against rollers 6 to cause the movement of rods 5 to open and keep the clamps open until new cherries are picked up as the chain makes its rounds.

Having described the construction of a machine embodying my invention, I will now describe the operation thereof.

In the loading stop 9 the clamp arms 3 may be spread and cherries deposited therein with the dimple down. In many cases, however, the dimple is lopsided, as shown in Fig. 6 with relation to a lopsided fruit 52. Here, while the dimple may be down, the proper pitting axis, as indicated by broken line 53, is not in a vertical position as it should be, and it is possible that a cherry with the axis cocked as shown, might cause the pitting knife to miss a square contact with the pit, and force it to one side within the cherry, rather than to push the pit out of the fruit. In order to straighten the fruit the clamp arms are released and brought together with a continuous pressure due to clamp spring 4, and this spring pressure, plus a slippage of the fruit within the clamp, in most cases, will cause the vertical axis of the lopsided fruit to shift to a more nearly vertical position. This turning of the fruit due to slippage under the spring urge is due to the fact that the spring urge tends to turn the fruit so that its shortest axis is spacing the clamp arms. Slippage is enhanced by the fact that practically all fruits of the type which can be handled by the machine of the present invention, are passed through the pitting machine covered with a pickling liquid known in the trade as brine. This pickling liquid is slippery and lubricates the cherry, thus helping the orientation of the fruit due to the action of the clamp arms.

Fruit, once having been gripped by the clamp arms in the loading position 9, is then progressed by the chain to the pitting position and is tightly held at that stop. At this time the cam 42 rotates and raises the comb assembly and the pitting plates to a point immediately beneath the fruit, as shown in Fig. 5. The pitting knife then descends to pass through the cherry to force the pit out of the cherry through the aperture in the flexible base plate 15 and to deposit it in the pit chamber 18.

The next action is caused by rotation of the comb cam 26. The comb traverses chamber 18, and two actions may then take place in accordance with whether or not a pit is actually present in the fruit chamber.

Immediately after the pitting operation, the clamped cherry is moved from beneath the pitting knife to inspection stop 46, the first stop after the pitting stop, and the cherry is momentarily held in this position. Assuming that a pit is present in chamber 18, this pit having been forced out of the cherry now in inspection stop 46, as shown in Fig. 1, movement of the male comb 19 pushes the pit out of chamber 18 ahead of the comb teeth 31, and the pit is then pushed against the female comb 32. This causes the female comb to swing upwardly to move comb arm 34 against flap 36, swinging flap 36 upwardly to a horizontal position directly beneath the fruit being held in the position of stop 46. At the instant that flap 36 arrives beneath the clamp in inspection stop 46, the clamp arms are released by the action of reciprocating rod 50. In this case flap 36 supports the fruit and keeps it in position between the clamp arms so that when the clamp arms 3 close again, they close on the fruit and transport it to the next discharge position 48 where the clamp arms are again released. The properly pitted fruit then drops in the pitted fruit chute 47. Thus, whenever a pit is present in chamber 18, the fruit in inspection position 46 will be supported by flap 36 and can therefore be reclamped and carried over to be released in the pitted fruit discharge chute 47.

If, however, there is no pit present in chamber 18, the pit being still in the fruit in stop 46, the action of the device is as shown in Fig. 5. Here, the male comb 19 passes straight through chamber 18 and the teeth of the male comb enter the slots 31 in female comb 32, and no motion of the supporting flap takes place. Therefore, when the clamp opens in position 46 the unpitted fruit has no support from clamp 36 and consequently falls out of the clamp into the unpitted fruit discharge chute 45. Thus, the pitted fruit is completely separated from the unpitted fruit, and all unpitted fruit dumped into chute 45 may then be returned to the main body of unpitted cherries and returned for a second run through the machine, as desired.

It will be noticed that the advancing edges of the teeth 30 on male comb 19 are slanted so that the pits of the fruit cannot be permanently caught between the male and female combs, but are forced downwardly by the pressure between the combs to fall in the pit chute 44. Thus, I have completely and automatically separated the pits, the unpitted fruit, and the pitted fruit, and performed a complete and exact inspection of the output of the pitter.

The motion of the comb assembly, the endless conveyor chains, and the comb reciprocation, are all properly synchronized by inter-connections easily apparent to those skilled in the art, so that the loading, pitting and inspection operations are carried on in continuous sequence, and at high speed. The device of my invention absolutely insures that no fruit having a pit therein is ever passed to the output of the device.

One other point should be noted, and that is that by the use of teeth and slots on the male and female combs, respectively, with complete or partial registry of the teeth in the slots during every cycle of the device, pits of different sizes can be handled by the combs. This construction also enables the pit to be ejected downwardly, and the full stroke of the teeth through the slots when a pit is not present, greatly aids in keeping the combs free from fruit flesh particles, gummy brine deposits, etc., and thus prevents pits from sticking to the combs and jamming the operation thereof.

I claim:

1. In a fruit pitting machine, the combination of cooperating arms for holding said fruit, pitting means, means for presenting said fruit in position to be operated on by said pitting means, means for removing fruit submitted to the action of said pitting means to a new position, means for releasing the hold on said fruit, and means operated in timely relation with the pitting means and governed by the reaction of a pit removed from said fruit for supporting said fruit between said arms when said hold is released, and means for causing said holding means to hold said supported fruit and means for again releasing said held fruit at a new position.

2. In a fruit pitting machine, the combination of a clamp having opposed arms movable to hold or release a fruit, means for performing a pitting operation on a fruit held in said clamp, means for moving said clamp arms to release said latter fruit, and means operated by the pit removed from said released fruit for maintaining said fruit between said clamp arms during release by said clamp arms, and means for moving said clamp arms in the opposite direction to again hold said fruit.

3. In a fruit pitting machine, the combination of a clamp having opposed arms movable in a horizontal plane to hold or release a fruit, means for performing a pitting operation on a fruit held in said clamp, means for moving said clamp arms to release said latter fruit, and means operated by the pit removed from said released fruit for maintaining said fruit between said clamp arms during release by said clamp arms, and means for moving said clamp arms in the opposite direction to again hold said fruit.

4. In a fruit pitting machine, the combination of a clamp having opposed arms movable in a horizontal plane to hold or release a fruit, means for performing a pitting operation on a fruit held in said clamp, means for receiving a pit if removed by said pitting means, means for moving said clamp arms to release said latter fruit, and means operated by the pit removed from said released fruit for maintaining said fruit between said clamp arms during release by said clamp arms, and means for moving said clamp arms in the opposite direction to again hold the fruit maintained between said clamp arms.

5. In a fruit pitting machine, the combination of a clamp having arms movable to grip a fruit to be pitted, a knife movable to be passed through said fruit while said fruit is being held to push the pit therefrom, means for receiving a pit if removed by said knife, means for moving said fruit to a new position, means for moving said arms to release the grip thereof on said fruit, a passage-way normally open to said released fruit, and means operable by the pit from the released fruit in said pit receiving means to block said passage-way at a point immediately below said clamp, thereby maintaining said fruit in position to be regripped by said arms.

6. In a fruit pitting machine, the combination of a clamp having arms movable to grip a fruit to be pitted, a knife movable to be passed through said fruit while said fruit is being held to push the pit therefrom, means for receiving a pit if removed by said knife, means for moving said fruit to a new position, means for moving said arms to release the grip thereof on said fruit, a passage-way normally open to said released fruit, a plunger traversable through said receptacle to push the pit therefrom, a gate swinging in said passage-way, and gate actuating means movable by pressure of said pit thereagainst.

7. In a fruit pitting machine, the combination of a clamp having opposed vertical arms horizontally movable, positive means for opening said clamp, spring means for closing said clamp, means for depositing a fruit between said arms to be gripped thereby by the action of said spring means, a pitting knife vertically movable through said fruit while gripped in said clamp to remove the pit therefrom, means for thereafter moving said fruit to a new position, means for opening said arms to drop said fruit, means operating by the pit removed from said dropped fruit to support said fruit between said arms during the time said arms are open, and means for releasing said arms to regrip the fruit so supported.

8. In a fruit pitting machine, the combination of a clamp having opposed vertical arms horizontally movable, positive means for opening said clamp, spring means for closing said clamp, means for depositing a fruit between said arms to be gripped thereby by the action of said spring means, a pitting knife vertically movable through said fruit while gripped in said clamp to remove the pit therefrom, means for thereafter moving said fruit to a new position, means for opening said arms to drop said fruit, means operating by the pit removed from said dropped fruit to support said fruit between said arms during the time said arms are open, means for releasing said arms to regrip the fruit so supported, means for removing said fruit to still another position, and means for dropping said fruit in the latter position.

9. In a fruit pitting machine, the combination of a clamp having opposed vertical arms horizontally movable, positive means for opening said clamp, spring means for closing said clamp, means for depositing a fruit between said arms to be gripped thereby by the action of said spring means, a pitting knife vertically movable through said fruit while gripped in said clamp to remove the pit therefrom, means for thereafter moving said fruit to a new position, means for opening said arms to drop said fruit, a receptacle to receive a pit extracted by said knife, a plunger movable through said receptacle to push the pit therefrom, a flap vertically movable to a plane immediately below the fruit in said new position to support said fruit when said arms are opened in that position, and flap actuating means moved by contact with said pit as moved by said plunger for raising said flap to fruit supporting position, said plunger failing to move said flap actuating means directly without the presence of the pit.

10. Apparatus as recited in claim 9, wherein teeth are provided on the end of said plunger entering slots in said flap actuating means irrespective of pit presence therebetween.

11. Apparatus as recited in claim 9, wherein teeth are provided on the end of said plunger entering slots in said flap actuating means irrespective of pit presence therebetween, and wherein the end of said teeth is at an angle to the sides of said stop, said angle opening downwardly to force the pits from between said teeth and said flap actuating means.

12. In a fruit pitting machine the combination of clamping means movable to hold and release a fruit while said fruit is under a displacement urge, means for performing a pitting operation on a fruit while being held against said urge, means for releasing the clamping hold on said fruit to allow said urge to act on said fruit, and means rendered operative by a pit removed from said fruit for preventing fruit displacement by said urge during release of said hold, said urge operating to displace said fruit out of control of said clamping means if no pit has been removed from said fruit.

13. In a fruit pitting machine, the combination of clamping means holding a pitted fruit in a predetermined position against an urge tending to displace said fruit from said clamping means, means for releasing said hold to allow said urge to act on said fruit, fruit pitting means, and means rendered operative by a pit removed from said fruit for maintaining said fruit in substantially said predetermined position during release of said hold, said urge operating to displace said fruit from said predetermined position and out of control of said clamping means if no pit has been removed from said fruit.

14. Apparatus as recited in claim 13, wherein means are provided to cause said clamping means to again hold only such fruit as remain in said predetermined position.

ELLSWORTH W. CARROLL.